(12) United States Patent
Shi et al.

(10) Patent No.: US 12,412,399 B2
(45) Date of Patent: Sep. 9, 2025

(54) CONTROL METHOD, CONTROL SYSTEM, AND CONTROL DEVICE FOR VEHICLE VIDEO AND AUDIO PLAY

(71) Applicant: PATEO CONNECT+ Technology (Shanghai) Corporation, Shanghai (CN)

(72) Inventors: Hongren Shi, Shanghai (CN); Chuxiong Zhang, Shanghai (CN); Shaojun Li, Shanghai (CN)

(73) Assignee: PATEO CONNECT+ Technology (Shanghai) Corporation, Shanghai (CN)

( * ) Notice: Subject to any disclaimer, the term of this patent is extended or adjusted under 35 U.S.C. 154(b) by 8 days.

(21) Appl. No.: 18/594,972

(22) Filed: Mar. 4, 2024

(65) Prior Publication Data
US 2024/0212358 A1 Jun. 27, 2024

Related U.S. Application Data

(63) Continuation of application No. PCT/CN2021/135043, filed on Dec. 2, 2021.

(30) Foreign Application Priority Data

Sep. 3, 2021 (CN) .......................... 202111034533.8

(51) Int. Cl.
*G06V 20/56* (2022.01)
*G06T 7/70* (2017.01)
(Continued)

(52) U.S. Cl.
CPC ............... *G06V 20/56* (2022.01); *G06T 7/70* (2017.01); *G06V 40/171* (2022.01); *H04N 5/74* (2013.01)

(58) Field of Classification Search
CPC .................................. G06V 20/56; H04N 5/74
(Continued)

(56) References Cited

U.S. PATENT DOCUMENTS

2010/0295782 A1* 11/2010 Binder .................... H04M 3/02
348/222.1

FOREIGN PATENT DOCUMENTS

| CN | 102970550 A | 3/2013 |
|----|-------------|--------|
| CN | 103543828 A | 1/2014 |

(Continued)

OTHER PUBLICATIONS

The World Intellectual Property Organization (WIPO) International Search Report for PCT/CN2021/135043 May 26, 2022 7 Pages (including translation).

*Primary Examiner* — Amir Shahnami
(74) *Attorney, Agent, or Firm* — ANOVA LAW GROUP, PLLC

(57) ABSTRACT

A control method for vehicle-mounted video and audio playback includes in response to activation of an vehicle-mounted video and audio mode, obtaining facial data of at least one user outside a vehicle, determining a pose parameter of a projection screen according to the facial data of the at least one user, adjusting a pose of the projection screen based on the pose parameter, controlling an vehicle-mounted projection device to project video data of video and audio data onto the projection screen, and controlling an vehicle-mounted external speaker to synchronously broadcast audio data of the video and audio data. The projection screen is integrated into a rear trunk door of the vehicle, and the rear trunk door is open, and the projection screen is in an expanded state in the vehicle-mounted video and audio mode.

20 Claims, 13 Drawing Sheets

(51) Int. Cl.
*G06V 40/16* (2022.01)
*H04N 5/74* (2006.01)
(58) Field of Classification Search
USPC .......................................... 348/148
See application file for complete search history.

(56) References Cited

FOREIGN PATENT DOCUMENTS

| | | | |
|---|---|---|---|
| CN | 105117023 | A | 12/2015 |
| CN | 107219889 | A | 9/2017 |
| CN | 207440513 | U | 6/2018 |
| CN | 108830164 | A | 11/2018 |
| CN | 109889807 | A | 6/2019 |
| CN | 109960401 | A | 7/2019 |
| CN | 110091806 | A | 8/2019 |
| CN | 110293912 | A | 10/2019 |
| CN | 210091248 | U | 2/2020 |
| CN | 111031298 | A | 4/2020 |
| CN | 111200689 | A | 5/2020 |
| CN | 111435269 | A | 7/2020 |
| CN | 111806340 | A | 10/2020 |
| CN | 111873929 | A | 11/2020 |
| CN | 112445342 | A | 3/2021 |
| CN | 112462566 | A | 3/2021 |
| CN | 112511812 | A | 3/2021 |
| CN | 112644406 | A | 4/2021 |
| CN | 112783585 | A | 5/2021 |
| JP | 2007022494 | A | 2/2007 |
| WO | 2021003172 | A1 | 1/2021 |

\* cited by examiner

CONTROL METHOD, CONTROL SYSTEM, AND CONTROL DEVICE FOR VEHICLE VIDEO AND AUDIO PLAY

CROSS-REFERENCE TO RELATED APPLICATION

The present disclosure is a continuation of International Application No. PCT/CN2021/135043, filed Dec. 2, 2021, which claims priority to Chinese Patent Application No. 202111034533.8, filed on Sep. 3, 2021, the entire contents of both of which are incorporated herein by reference.

TECHNICAL FIELD

The present disclosure relates to the vehicle technology and, more particularly, to a control method, a control system, and a control device for playing video and audio on a vehicle.

BACKGROUND

As vehicles are broadly used, they are not used only as transportation tools. The space of a vehicle expands outward and is no longer limited to inside the vehicle but expands outside the vehicle.

To solve the problems in the existing technologies, a control method, a control system, and a control device for vehicle-mounted video and audio playback needs to be developed to perform video and audio projection for the user outside the vehicle. The position of the vehicle-mounted projection screen can be automatically adjusted according to facial data of the user to adapt to the viewing angle of the user. Thus, the user experience for the vehicle-mounted video and audio mode is significantly improved.

SUMMARY

Embodiments of the present disclosure provide a control method for vehicle-mounted video and audio playback. The method includes in response to activation of an vehicle-mounted video and audio mode, obtaining facial data of at least one user outside a vehicle, determining a pose parameter of a projection screen according to the facial data of the at least one user, adjusting a pose of the projection screen based on the pose parameter, controlling an vehicle-mounted projection device to project video data of video and audio data onto the projection screen, and controlling an vehicle-mounted external speaker to synchronously broadcast audio data of the video and audio data. The projection screen is integrated into a rear trunk door of the vehicle, and the rear trunk door is open, and the projection screen is in an expanded state in the vehicle-mounted video and audio mode.

Embodiments of the present disclosure provide a control system for vehicle-mounted video and audio playback, including a control device, an adjustment mechanism, a projection screen, an vehicle-mounted projection device, an vehicle-mounted external speaker, a wakeup subsystem, and an vehicle-mounted camera device. The projection screen is connected to a rear trunk door of a vehicle via the adjustment mechanism to expand the projection screen when the rear trunk door is opened. The vehicle-mounted projection device is arranged in an inner space enclosed by panels of a vehicle body of the vehicle and configured to project video data of video and audio data onto the projection screen when the vehicle-mounted projection device is activated. The vehicle-mounted external speaker is arranged on an inner side of the panels of the vehicle body of the vehicle and configured to synchronously broadcast audio data of the video and audio data after the vehicle-mounted external speaker is activated. The wakeup subsystem is configured to wake up a control device based on a predetermined instruction to open the rear trunk door of a vehicle, the vehicle-mounted projection device, and the vehicle-mounted external speaker. The vehicle-mounted camera device is configured to obtain facial data of at least one user outside the vehicle. The control device is communicatively connected to the vehicle-mounted camera device, the adjustment mechanism, the vehicle-mounted projection device and the vehicle-mounted external speaker. The control device is configured to receive the facial data of the at least one user outside the vehicle obtained by the vehicle-mounted camera device after being woken up by the wake-up sub-system to open the rear trunk door of the vehicle, the vehicle-mounted projection device, and the vehicle-mounted external speaker, determine a pose parameter of the projection screen according to the facial data of the at least one user, and output the pose parameter to the adjustment mechanism. The adjustment mechanism is configured to adjust a pose of the projection screen based on the pose parameter.

Embodiments of the present disclosure provide a control device for vehicle-mounted video and audio playback, including one or more processors and one or more memories. The one or more memories are coupled to the one or more processors and storing instructions that, when executed by the one or more processors, cause the one or more processors to in response to activation of an vehicle-mounted video and audio mode, obtain facial data of at least one user outside a vehicle, determine a pose parameter of a projection screen according to the facial data of the at least one user, adjust a pose of the projection screen based on the pose parameter, control an vehicle-mounted projection device to project video data of video and audio data onto the projection screen, and control an vehicle-mounted external speaker to synchronously broadcast audio data of the video and audio data. The projection screen is integrated into a rear trunk door of the vehicle, and the rear trunk door is open, and the projection screen is in an expanded state in the vehicle-mounted video and audio mode.

REFERENCE NUMERALS

Figure 1A:
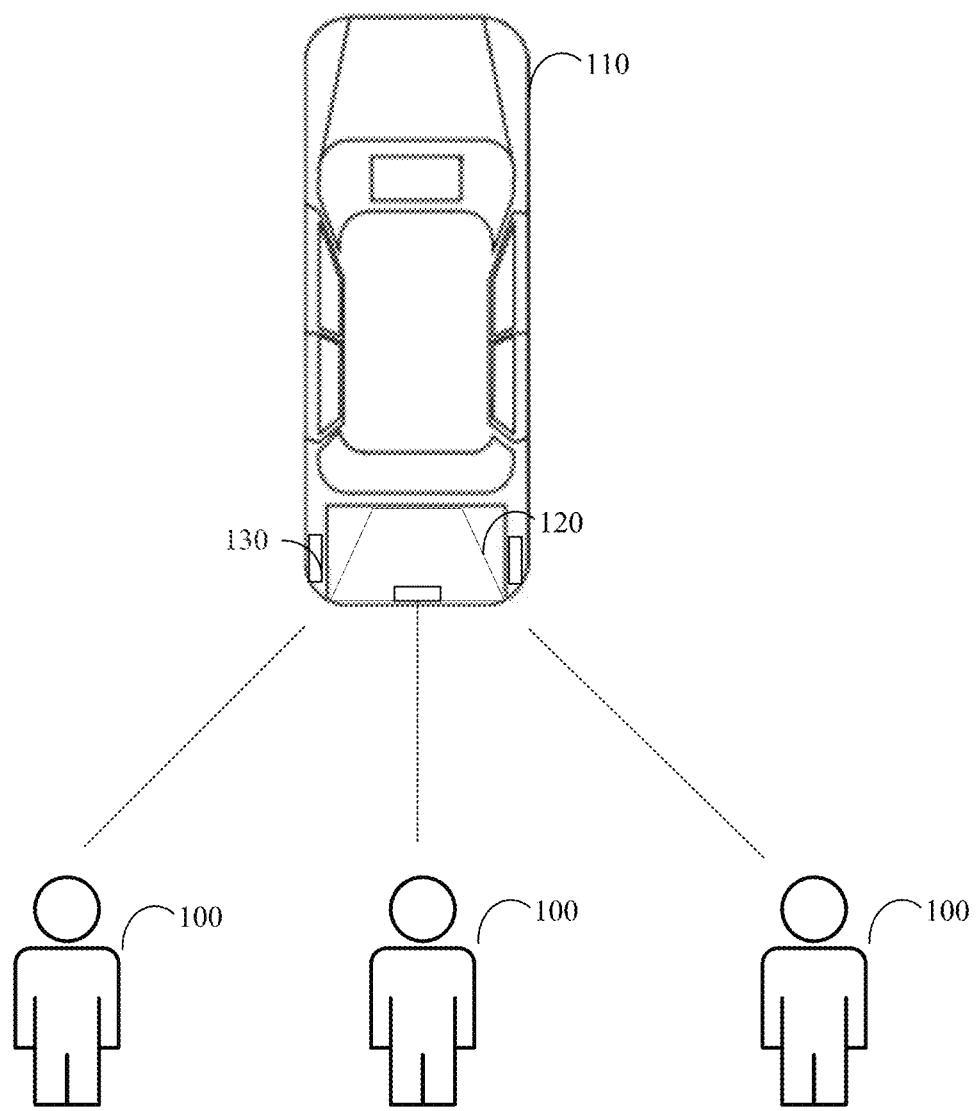
FIG. 1A is a schematic diagram of an application scene according to some embodiments of the present disclosure.

| | | |
|---|---|---|
| 100-104 User | 110 Vehicle | 120, 240, 240' Projection screen |
| 130, 270 External speaker carried by vehicle | | |
| 140, 260 Projection device carried by vehicle | | |
| 200 Control system | 210 Wake up sub-system | |
| 230 Camera device carried by vehicle | | 220 Control device |
| 280 Positioning device | | 250 Adjustment mechanism |
| 1000 Control device | 10001 Memory | 290 Power system |
| 1003 Bus | 1004 Random-access memory (RAM) | 1002 Processor |
| 1005 High-speed cache | | 1006 Storage system |
| 1007 Program module | | 1008 External equipment |
| 1009 Monitor | 1010 Input/output (I/O) interface | |
| 1011 Network adapter | | |

DETAILED DESCRIPTION OF EMBODIMENTS

The present disclosure is described in detail in connection with the accompanying drawings and embodiments of the present disclosure. Aspects described in connection with the accompanying drawings and embodiments of the present disclosure are exemplary and cannot be understood as limiting the scope of the present disclosure.

The description provided below enables those skilled in the art to implement and utilize the present disclosure within specific application contexts. Variations and various applications within different applications are apparent to those skilled in the art. The general principles defined here can be applied to a broad range of embodiments. Therefore, the present disclosure is not limited to the specific embodiments of the present disclosure but should conform to the broadest scope consistent with the principles and novel features of the present disclosure.

In the detailed description below, many specific details are provided to offer a thorough understanding of the present disclosure. However, it is apparent to those skilled in the art that the present disclosure can be implemented without being limited to these details. That is, the known structures and devices can be shown in block diagrams without details to avoid obscuring the present disclosure.

All documents and references submitted concurrently with and opened to the public in conjunction with the present specification are incorporated into this document by reference. Unless otherwise stated directly, all features disclosed in the present specification (including any accompanying claims, abstract, and drawings) can be replaced by alternative features used to achieve the same, equivalent, or similar purposes. Thus, unless explicitly stated otherwise, each feature disclosed is just one example of a set of equivalent or similar features.

The terms such as "left," "right," "front," "rear," "top," "bottom," "up," "down," "clockwise," and "counterclockwise" are employed solely for convenience and do not imply any specific fixed direction. In fact, they are used to reflect the relative positions and/or orientations of various parts of an object. Furthermore, the terms "first" and "second" are used for descriptive purposes and should not be understood as indicative of relative importance.

Further, good, furthermore, and better are simple starting points for elaborating another embodiment based on previous embodiments. The content after further, good, furthermore, and better can be combined with the previous embodiments to be another embodiment. After the same embodiment, several embodiments after further, good, furthermore, and better can be combined arbitrarily into another embodiment.

The present disclosure is described in detail in connection with the accompanying drawings and specific embodiments. Aspects described in connection with the accompanying drawings and specific embodiments are merely exemplary and should not be construed as limiting the scope of the present disclosure.

As vehicles are broadly used, vehicles are not applied only as transportation tools. The space of a vehicle expands outward and is no longer limited in the vehicle but expands outside the vehicle.

To enable vehicle-mounted cinema and karaoke, vehicle-based video conferencing and PowerPoint presentations, etc. In the existing technologies, a solution is provided for arranging an vehicle-mounted screen. However, due to limited space in the vehicle, the screen arranged in the vehicle has a small size. Moreover, a passenger feels uncomfortable after sitting in the vehicle for a long time without airflow. In addition, a passenger in a front row affects a viewing effect of a passenger in a rear row.

In addition, in the existing technologies, a solution of allowing the passenger to view a large screen arranged at the front of the vehicle through the front windshield is provided. However, the passenger is far away from the screen, the passenger sits in the vehicle cab, and the cab is normally lower than the large screen at the front of the vehicle. Thus, the passenger needs to view with head up, and the viewing angle is not good. The passenger is uncomfortable and has poor participation and experience.

As mentioned above, one of the mainstream implementation methods for vehicle-mounted video and audio playback mode is to install an vehicle-mounted screen in the vehicle. However, since the vehicle has limited space in the vehicle, the size of the vehicle-mounted screen can be small. Thus, the viewing experience of the user can be greatly reduced. In another method, considering the size of the vehicle-mounted screen above, a projection screen can be arranged outside the vehicle. However, in this method, how to open and close the projection screen is focused, and the viewing comfort level of the user impacted by the angle of the screen is not considered. In addition, the projection screen arranged outside the vehicle is usually fixed at a simple support. The distance and the orientation angle between the screen and the user cannot be automatically adjusted. The user has to manually adjust the direction and the distance of the screen to position the screen within the distance range suitable for the user to view and position the screen to face the user.

To address the existing issues, the present disclosure provides a control method, a control device, and a control system for in-vehicle video and audio playback, which provides an vehicle-mounted video and audio mode of projecting the video and audio for the user outside the vehicle. The position of the vehicle-mounted projection screen can be automatically adjusted according to the facial data of the user outside the vehicle to adapt to the viewing angle of the user. The user does not need to adjust the position manually, which significantly improves the user experience of the vehicle-mounted video and audio mode.

In some embodiments, one aspect of the present disclosure provides a control method for vehicle-mounted video and audio playback, which can be implemented by the control system and the control device for vehicle-mounted video and audio playback of the present disclosure. In some embodiments, the control device for vehicle-mounted video and audio playback can include a memory and a processor. The memory can include but is not limited to a computer-readable storage medium of the present disclosure, which stores computer instructions. The processor can be connected to the memory and configured to perform the computer instructions stored in the memory to implement the control method for vehicle-mounted video and audio playback.

The operational principles of the control device and the control system for vehicle-mounted video and audio playback can be described in some control method embodiments for vehicle-mounted video and audio playback. Those skilled in the art can understand that these embodiments of the control method for vehicle-mounted video and audio playback are non-limiting and are intended to clearly demonstrate the main concept of the present disclosure and to provide some specific solutions that are convenient for the public to implement. These embodiments are not intended to limit all the operational modes and functions of the control device and control system for vehicle-mounted video and audio playback. Similarly, the control device and control system for vehicle-mounted video and audio playback are also non-limiting embodiments of the control method for vehicle-mounted video and audio playback of the present disclosure, which does not limit implementation bodies of the processes of the control method for vehicle-mounted video and audio.

First, an application scene of the present disclosure is understood by referring to FIG. 1A. As shown in FIG. 1A, the present disclosure is applied to an vehicle-mounted environment. A user 100 can view the video and audio provided by an vehicle-mounted projection device and an vehicle-mounted external speaker from outside a vehicle 110. The user can playback and enjoy the video and audio using the vehicle-mounted projection device, a projection screen 120, and the vehicle-mounted external speaker of the vehicle from outside settings, e.g., lawns, squares, campsites, and indoor settings, e.g., underground parking lots, spacious factories, workshops, indoor sports facilities, etc.

At least one vehicle-mounted external speaker 130 for emitting sound outwards can be arranged at an inner side of a body panel of the vehicle 110 to provide a sound output function to the outside the vehicle 110. The vehicle projection device 140 can be arranged at the rear trunk of the vehicle 110. Considering that the user faces right to the rear trunk door of the vehicle 110, in some embodiments, a plurality of vehicle-mounted external speakers can be arranged on an inner side of the panel of the rear trunk door (e.g., in the middle and on two sides of the rear trunk). Thus, when the video and audio data are played, the vehicle-mounted external speaker facing right to the user and close to the user can be used preferably.

Figure 1B:
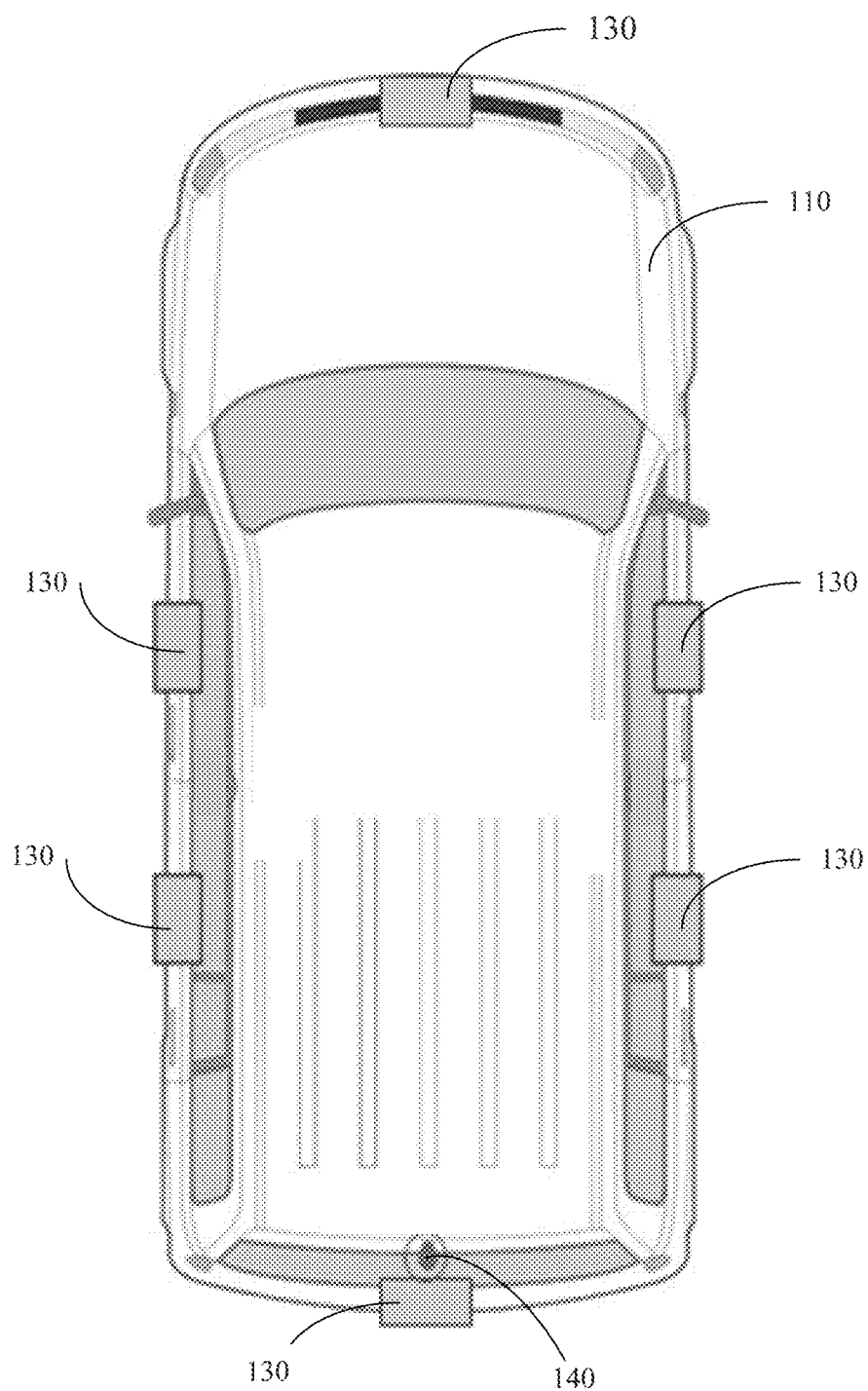
FIG. 1B is a schematic structural diagram of a vehicle from a top view according to some embodiments of the present disclosure.

In some embodiments, as shown in FIG. 1B, to create a more stereophonic sound experience, vehicle-mounted external speakers 130 are arranged at the right and left doors, the front hood, and the rear trunk door of the vehicle 110. Thus, the external speakers can operate to create a stereophonic and surrounding sound field.

Figure 1C:
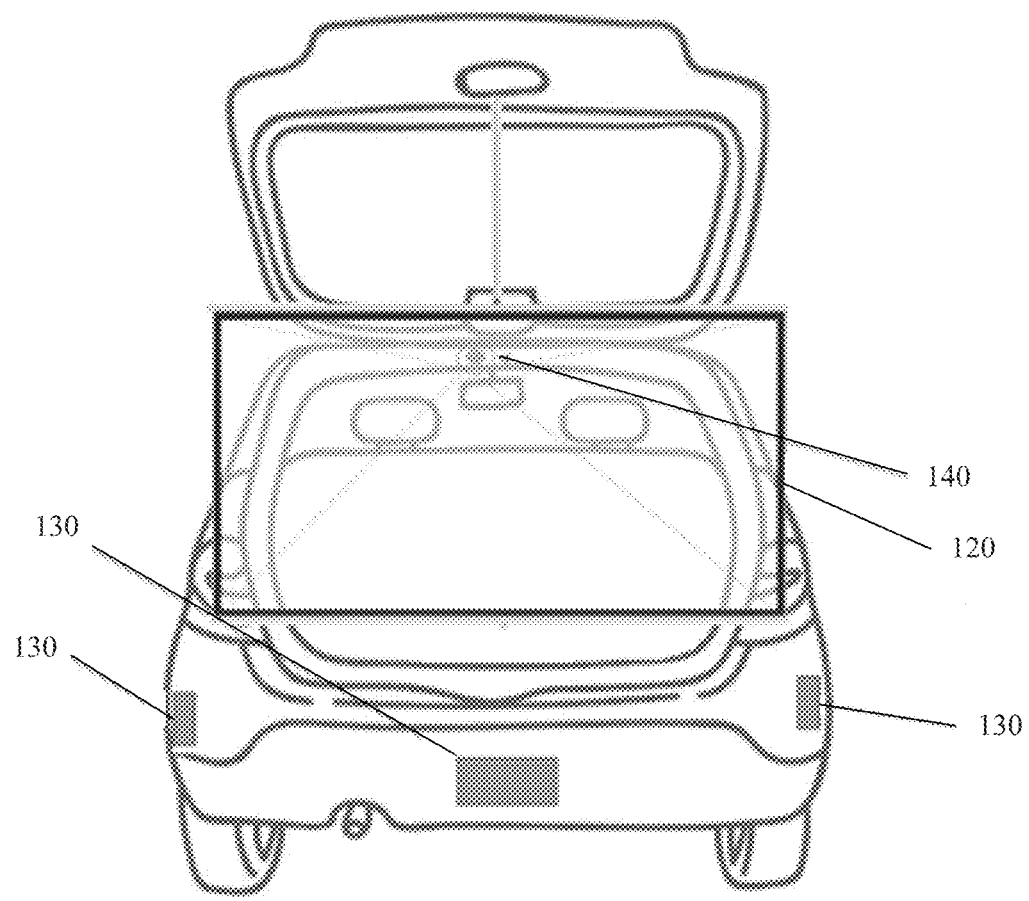
FIG. 1C is a schematic structural diagram of a rear member of a vehicle according to some embodiments of the present disclosure.

FIG. 1C is a schematic structural diagram of an vehicle-mounted projection device 140 and a projection screen 120 at the rear trunk door according to some embodiments of the present disclosure. When the vehicle 110 is in a parked state, in response to the activation of the vehicle-mounted video and audio mode, the rear trunk door of the vehicle 110 can be opened. The projection screen 120 in the rear trunk can be expanded and fixed between the rear trunk door and the vehicle body.

In connection with FIG. 1A and FIG. 1C, as shown in FIG. 1C, the vehicle-mounted projection device 140 is arranged at the top of the rear frame of the vehicle. Then, the vehicle-mounted projection device 140 and the user 100 are on two sides of the projection screen 120. Thus, the vehicle-mounted video and audio can be projected and played on the projection screen 120 using a projection mode of rear projection. That is, the light of the vehicle-mounted projection device 140 can be projected onto the projection screen 120 and be seen by the user 100 after penetrating the projection screen 120. In the rear projection, the ambient light may not need to be controlled. The rear projection is suitable for the outdoor environment with good ambient light and lighting.

Figure 2:
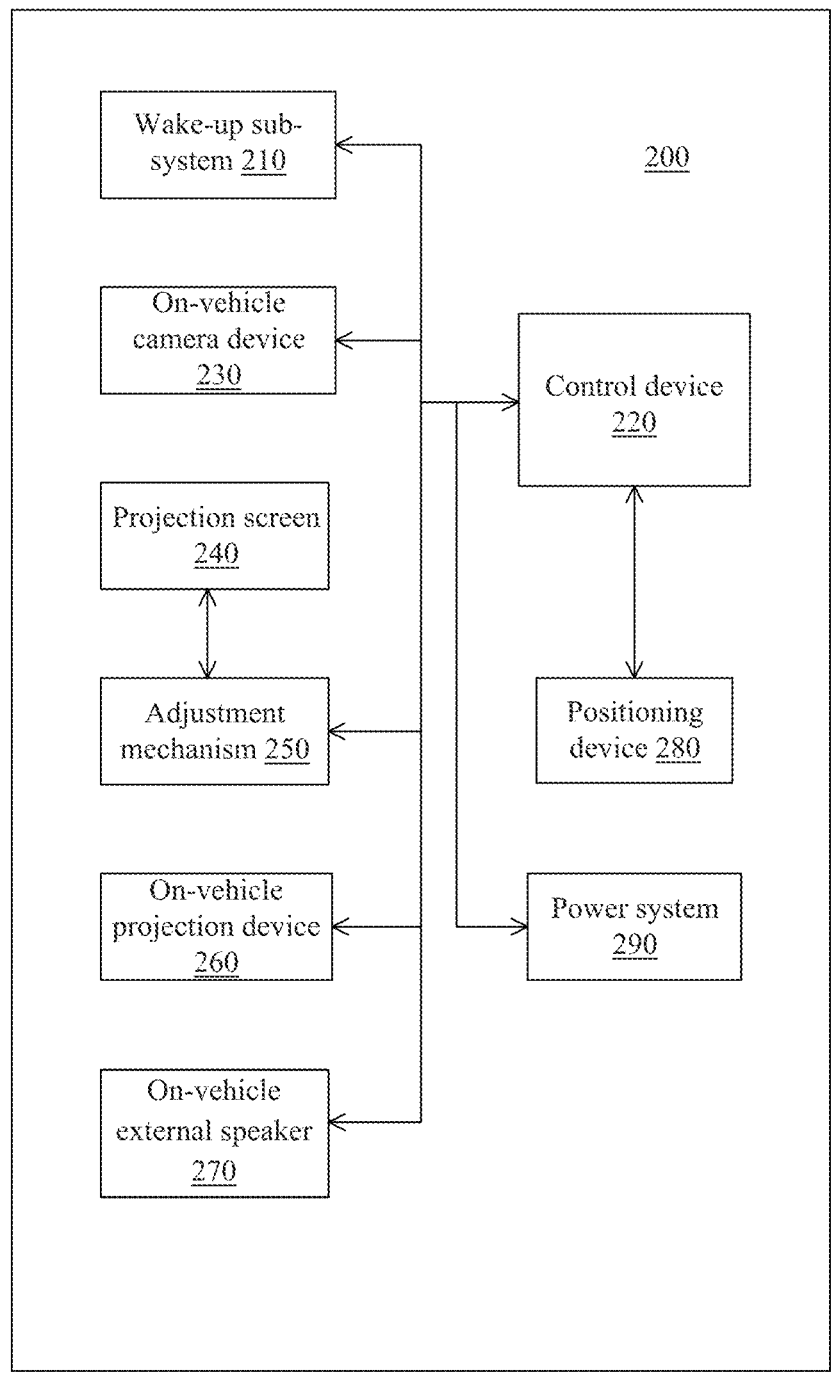
FIG. 2 is a schematic structural diagram of a control system for playing a video or audio in a vehicle according to some embodiments of the present disclosure.

To better understand the control method for vehicle-mounted video and audio playback of the present disclosure, FIG. 2 shows a schematic structural diagram of the control system for vehicle-mounted video or audio playback according to some embodiments of the present disclosure.

As shown in FIG. 2, in some embodiments, the control system 200 for vehicle-mounted video and audio playback includes a wake-up subsystem 210, a control device 220, an vehicle-mounted camera device 230, a projection screen 240, an adjustment mechanism 250, an vehicle-mounted projection device 260, and vehicle-mounted external speakers 270. The control device 220 is communicatively connected to the vehicle-mounted camera device 230, the adjustment mechanism 250, the vehicle-mounted projection device 260, and the vehicle-mounted external speakers 270.

The wake-up subsystem 210 can be configured to wake up the control device 220 according to a predetermined instruction. These predetermined instructions can include a control instruction issued by the user. In response to the control device 220 being woken up, the rear trunk door of the vehicle can be opened, and the vehicle-mounted projection device 260 and the vehicle-mounted external speakers 270 can be activated. The projection screen 240 can be connected to the rear trunk door of the vehicle by the adjustment mechanism 250. The projection screen 240 can be expanded as the rear trunk door is opened. The vehicle projection device 260 can be arranged in an internal space enclosed by the panels of the vehicle body. After the vehicle-mounted projection device 260 is activated, video data of the video and audio data can be projected onto the projection screen 240. The vehicle-mounted external speakers 270 can be arranged on the inner side of the panels of the vehicle body. After the vehicle-mounted external speakers 270 are activated, the audio data of the video and audio data projected onto the projection screen 240 can be synchronously broadcasted to the outside of the vehicle. The vehicle-mounted camera device 230 can be configured to obtain the facial data of at least one user outside the vehicle.

In embodiments shown in FIG. 2, the control system 200 also includes a positioning device 280 and a power system 290. Both the positioning device 280 and the power system 290 can be communicatively connected to the control device 220.

Figure 3:
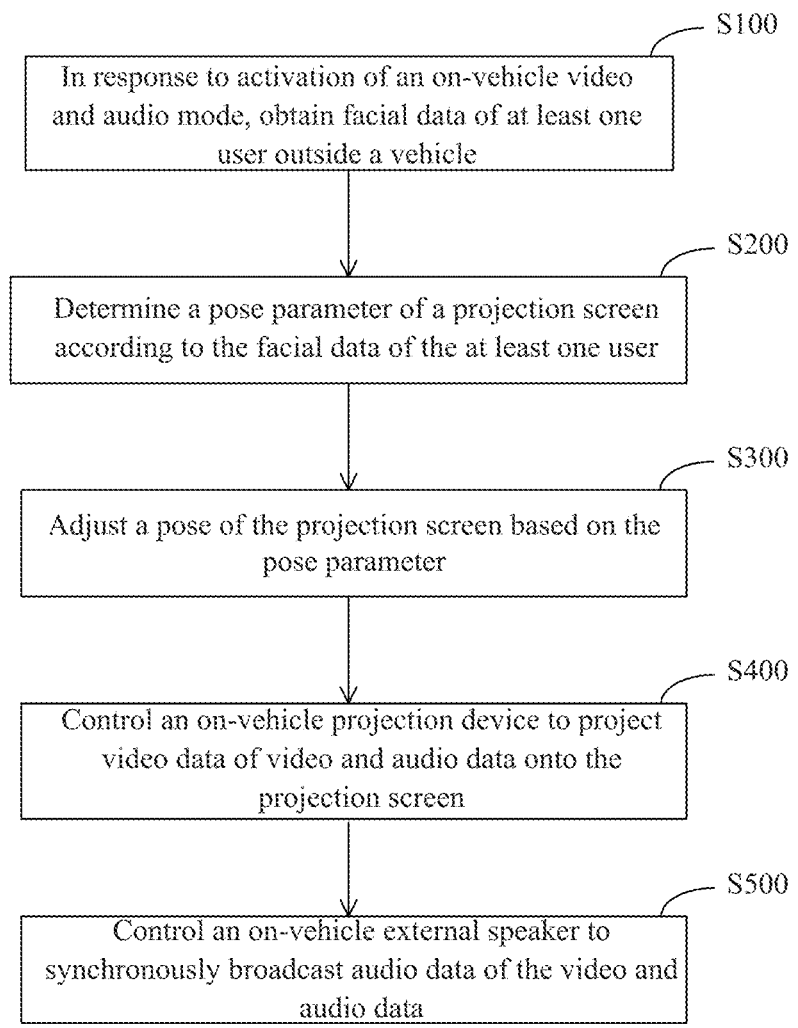
FIG. 3 is a schematic flowchart of a control system for playing a video or audio in a vehicle according to some embodiments of the present disclosure.

The control method for vehicle-mounted video and audio playback is described in connection with the control system 200 for vehicle-mounted video and audio playback. As shown in FIG. 3, the control method for vehicle-mounted video and audio playback of the present disclosure includes the following processes.

At S100, in response to the activation of the vehicle-mounted video and audio mode, the facial data of the at least one user outside the vehicle is obtained.

At S200, a pose parameter of the projection screen is determined according to the facial data of the at least one user.

At S300, the pose of the projection screen is adjusted based on the pose parameter.

At S400, the vehicle-mounted projection device is controlled to project the video data of the video and audio data onto the projection screen.

At S500, the vehicle-mounted external speakers are controlled to broadcast the audio data of the projected video and audio data.

In process S100, the control method for vehicle-mounted video and audio playback of the present disclosure can be activated in response to the activation of the vehicle-mounted video and audio mode. In some embodiments of the present disclosure, the control device 220 can be awakened by providing the predetermined instruction to the wake-up subsystem 210 to activate the vehicle-mounted video and audio mode. The wake-up subsystem 210 can be a system that monitors the user instruction with low power consumption to receive the user instruction in real-time. The predetermined instruction can include a voice instruction with a predetermined phrase (e.g., activate outdoor video and audio mode).

In other embodiments, the user can communicatively interact with the vehicle through a smart mobile terminal (e.g., cell phone) to realize the functions of controlling and managing the vehicle at the smart mobile terminal. Thus, in some embodiments, the user can issue the wake-up instruction through the smart terminal to instruct the vehicle-mounted video and audio mode to be activated. The wake-up sub-system 210 can wake up the control device 220 after receiving the wake-up instruction sent by the smart terminal to activate the vehicle-mounted video and audio mode of the vehicle to start the control method.

In response to the activation of the vehicle-mounted video and audio mode, the rear trunk door can be opened. The rear trunk door can be manually opened by the user. In some embodiments, the control device 220 can control the rear trunk door to be automatically opened in response to the activation of the vehicle-mounted video and audio mode. Those skilled in the art can adopt the existing or future automatic door-opening technologies to open the rear trunk door. The projection screen 240 can be integrated into the rear trunk door of the vehicle and can be connected to the rear trunk door of the vehicle through the adjustment mechanism. After the vehicle-mounted video and audio mode is activated and the rear trunk door is opened, the adjustment mechanism 250 can control the projection screen 240 to be expanded.

In response to the vehicle-mounted video and audio mode, the control device 220 can be configured to activate the vehicle-mounted projection device 260 and the vehicle-mounted external speaker 270 to cause the vehicle-mounted projection device 260 and the vehicle-mounted external speaker 270 to be in a standby mode to respond to the instruction of the control device 220 any time to play the video and audio data.

Further, in process S100, the facial data of the at least one user outside the vehicle can be obtained in response to the vehicle-mounted video and audio mode. In process S100, the facial data of the user can be obtained so that the projection screen can be adjusted to the screen pose that is suitable for the user to view based on the facial data of the user. Thus, the vehicle-mounted camera device for obtaining the facial data can be arranged at the projection screen. Thus, the camera device can directly obtain the relative position relationship between the user and the projection screen. If the vehicle-mounted camera device for obtaining the facial data of the user is not arranged at the projection screen, the relative position relationship between the vehicle-mounted camera device and the projection screen may need to be determined in the early debugging phase, and the relative position relationship between the vehicle-mounted camera device and the projection screen can be considered when the pose of the projection screen is determined subsequently based on the facial data of the user.

On one hand, the facial data of the user can refer to the data, according to which the number and distribution of the user can be determined by recognizing the face. On another hand, facial feature points of each user can be determined according to the facial data of the user. Thus, the rotation angle of the face of each user can be determined. Then, the pose of the projection screen can be determined according to the facial data of the user.

Figure 4A:
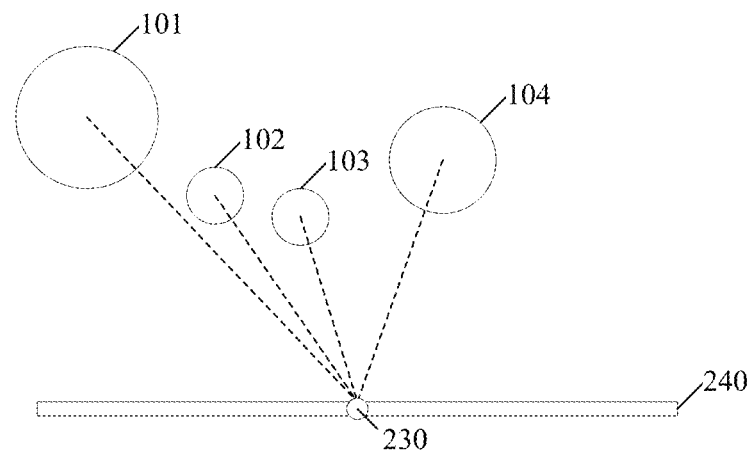
FIG. 4A is a schematic top view showing a relationship between a user and a projection screen according to some embodiments of the present disclosure.

The facial data of the user is explained in connection with FIGS. 4A-4C. FIG. 4A shows the relationship between users 101-104 and the projection screen 240 from the top view. As shown in FIG. 4A, the vehicle-mounted camera device 230 is arranged at the middle position at the top of the projection screen 240. The vehicle-mounted camera device 230 can be a depth camera device. Through the vehicle-mounted camera device 230, the number of users can be obtained according to the number of faces recognized (FIG. 4A shows 4 users). Without considering the facial poses, that is, the face of the user is considered as a point or circle, the distribution of the users relative to the projection screen 240 can be obtained, i.e., the facial feature position data, such as the distances, positions, and heights, of the users 101-104 relative to the vehicle-mounted camera device 230. The facial data can be the facial feature position data including at least one of a distance, a position, or a height of at least one user relative to the on-vehicle camera device. That is, the facial data can include the facial feature position data representing the relative positions between the users 101-104 and the projection screen 240. The distances can be straight-line distances or vertical distances, i.e., depth information. The positions and heights can be represented by the coordinates of the users relative to the vehicle-mounted camera device 230 (i.e., the coordinates of the users in the coordinate system with the vehicle-mounted camera device 230 as an origin) or by the relative directions (e.g., 15 degrees to the left or up).

Figure 4B:
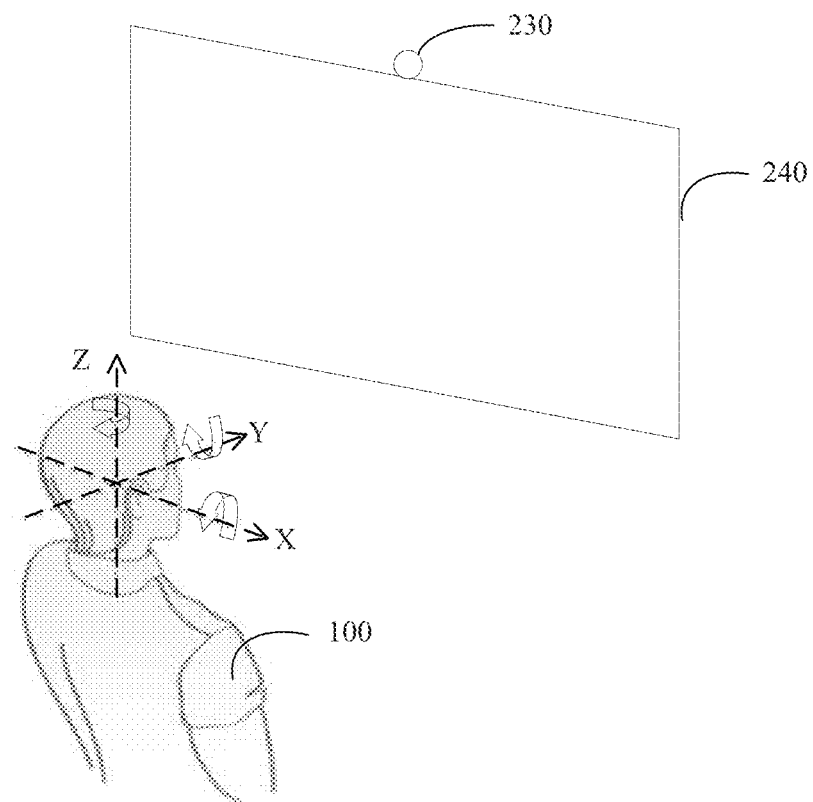
FIG. 4B is a schematic main view showing a relationship between a user and a projection screen according to some embodiments of the present disclosure.
Figure 4C:
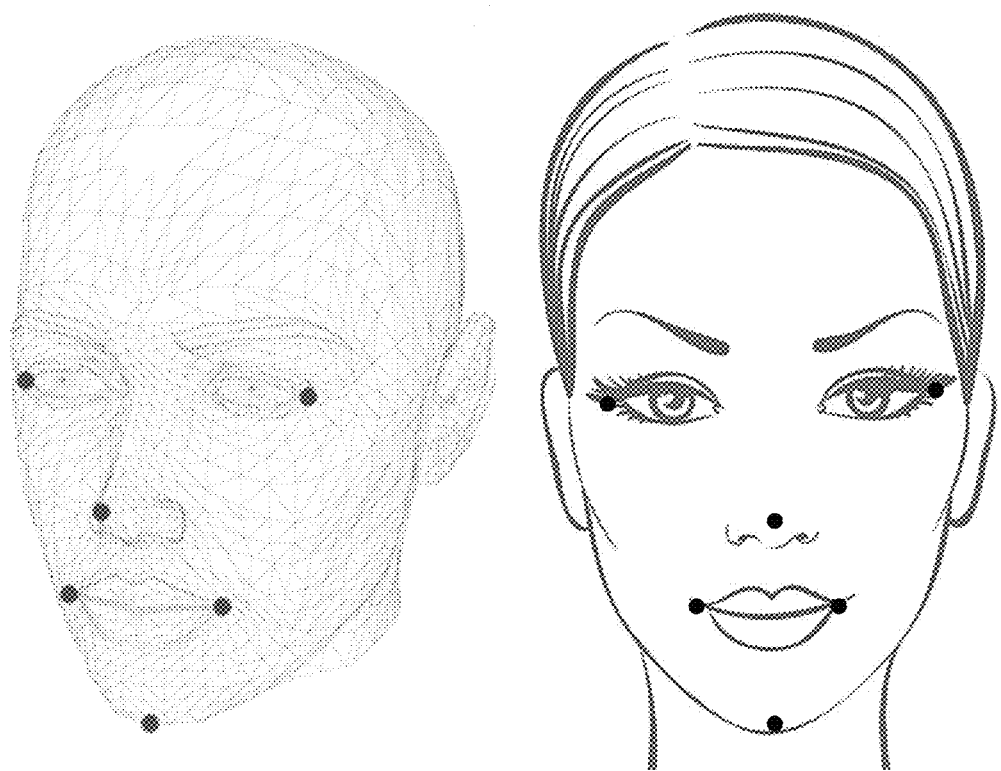
FIG. 4C is a schematic diagram showing a facial image and a critical point of obtaining a user facial pose according to some embodiments of the present disclosure.

The facial data of the user can be further explained by referring to FIGS. 4B-4C. FIG. 4B shows the relationship between the user 100 and the projection screen 240 from a front view. As shown in FIG. 4B, even if the body position of the user is determined, the user can still tilt the head (rotate around axis Y), rotate the head up and down (around axis X), or rotate the head left and right (around axis Z). Different rotation angles of the face can also affect the view angle of the user. That is, the facial data can include the facial rotation angles representing the facial poses.

The process of obtaining the facial rotation angle is further explained by referring to FIG. 4C. The facial rotation angle can be the relative rotation angle between the current position of the face (the left side in FIG. 4C) and the reference position (the right side in FIG. 4C). The reference position can be the position, from which the facial rotation angles of different directions are 0. The actual face image of the user on the left side in FIG. 4C can be obtained through the vehicle-mounted camera device 230 (representing the current position of the face). The reference image on the right side in FIG. 4C can be obtained by face detection and facial key point detection (representing the reference position). As shown in FIG. 4C, 6 key points are defined, i.e., the left eye corner, the right eye corner, the nose tip, the left mouth corner, the right mouth corner, and the chin. The key points can be used to represent the facial model. The user can set the key points and the quantity of the key points related to the accuracy of estimating the facial rotation angle according to the actual needs. After obtaining the face image on the left side and the reference image on the right side in FIG. 4C, the rotation vector of the face image on the left side being changed to the reference image in FIG. 4C is parsed. The rotation vector can be converted to a corresponding Euler angle to obtain the facial rotation angle.

Those skilled in the art can understand that Euler angles are independent angular parameters three in a group used to uniquely determine a position of a body rotating around a fixed point. Euler angular coordinates are explained by referring to FIG. 4B. As shown in FIG. 4B, a pitch angle is defined with the rotation around axis X, a yaw angle is defined with the rotation around axis Y, and a roll angle is defined with the rotation around axis Z.

Further in connection with FIG. 5A, FIG. 5B, FIG. 6A, FIG. 6B, FIG. 7A, and FIG. 7B, process S200 of determining the pose parameter of the projection screen according to the facial data of the at least one user is described in detail. The pose can be the position and orientation of the projection screen.

Figure 5A:
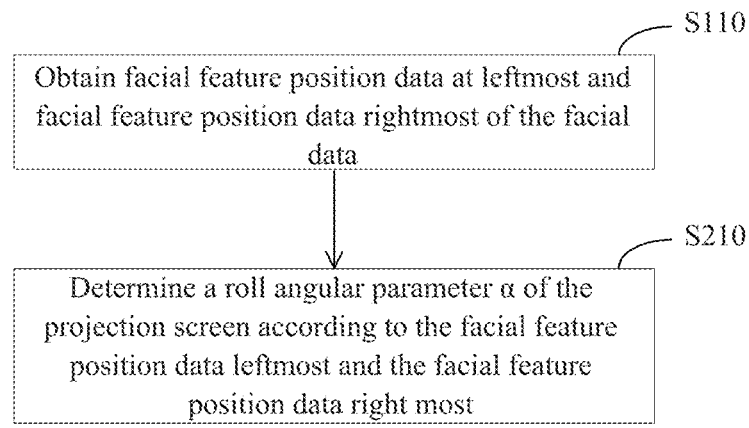
FIG. 5A is a schematic flowchart of determining a roll angle parameter of a projection screen according to some embodiments of the present disclosure.

To implement process S200, as shown in FIG. 5A, process S100 is further refined into process S110 of obtaining facial feature position data at leftmost and facial feature position data rightmost of the facial data. Then, process S200 is further refined into process S210 of determining a roll angular parameter α of the projection screen according to the facial feature position data leftmost and the facial feature position data rightmost.

The method in FIG. 5A is further explained in connection with FIG. 5B. In process S110, obtaining the facial feature position data leftmost can refer to the facial feature position data of the distance, the position, and the height of the user 101 leftmost relative to the vehicle-mounted camera device 230 in the collected image. The facial feature position data right most can refer to the facial feature position data of the distance, the position, the height of the user 104 relative to the vehicle-mounted camera device 230 in the collected image.

Figure 5B:
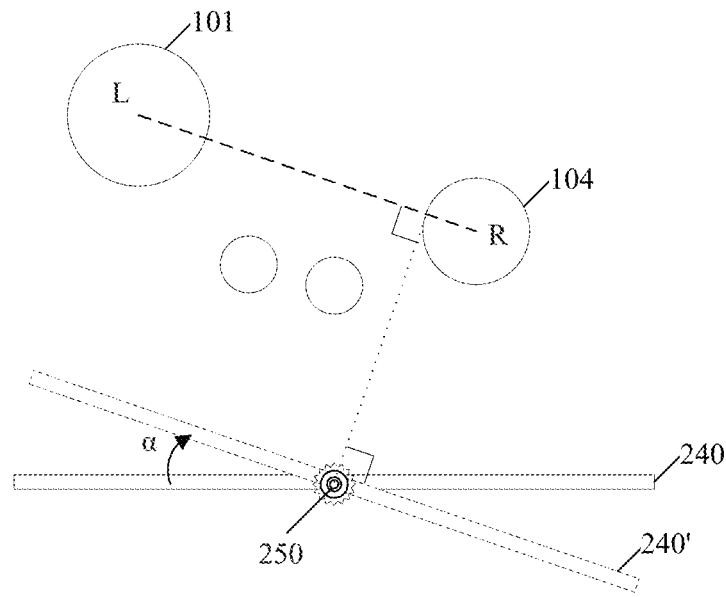
FIG. 5B is a schematic diagram of adjusting a roll angle of a projection screen from a top view angle according to some embodiments of the present disclosure.

In process S210, as shown in FIG. 5B, the projection screen 240 is expected to be parallel to the plane formed by users 101 and 104 (denoted as line LR in the drawing). Since the depth and position of users 101 and 104 relative to the vehicle-mounted camera device 230 have been obtained in process S110, the distance of LR can be determined according to the facial feature position data leftmost and the facial feature position data rightmost. Then, the roll angle α can be determined according to the depths of users 101 and 104 relative to the vehicle-mounted camera device 230 and the distance of LR. The control device 220 can be configured to adjust the roll angle α of the projection screen 240 by controlling the adjustment device 250 of the projection screen 240. The adjustment device 250 can be an angular adjustment device including, for example, a gear and a drive member. Thus, the adjustment device 250 can drive the projection screen 240 to rotate from the initial position to a projection screen 240' parallel to plane LR based on the determined roll angle α.

In some other embodiments of the present disclosure, when there is only one user at the site, the facial feature position data leftmost and rightmost can be the depths and positions of two key points at the left eye corner and the right eye corner of the user facial model relative to the projection screen 240. The method for obtaining the roll angle of the projection screen 240 is described above and is not repeated here. In some other embodiments, the roll angle of the face of the only user obtained according to the pose of the face can be directly regarded as the roll angular parameter of the projection screen 240.

In some embodiments, the difference between the distances between the leftmost and the rightmost of the faces of the users and the projection screen 240 can be too big. The projection screen 240 can be adjusted according to the roll angular parameter to cause the distances between the leftmost and the rightmost of the users and the projection screen 240 to be approximately the same. Thus, the roll angle of the on-vehicle projection screen can be adjusted by collecting the position information of the users at the boundary of the right and left ends outside the vehicle to satisfy the viewing angles of the plurality of users in front of the screen. Moreover, the view angles of the users at the boundary of the right and left ends can be satisfied with good video and audio experience.

Figure 6A:
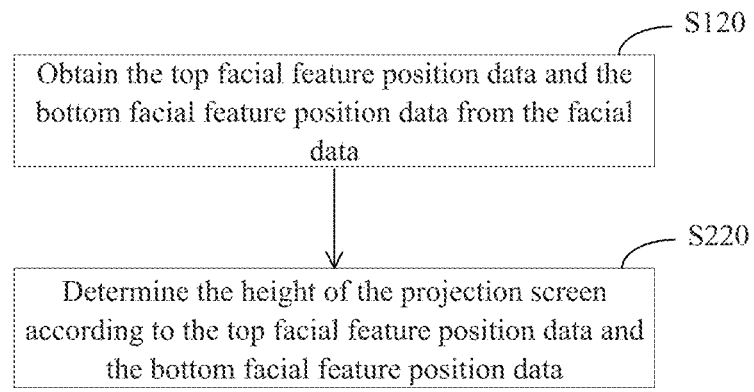
FIG. 6A is a schematic flowchart of determining a height parameter of a projection screen according to some embodiments of the present disclosure.

To implement process S200, as shown in FIG. 6A, process S100 is further refined into process S120 of obtaining the top facial feature position data and the bottom facial feature position data from the facial data. Subsequently, process S200 is further refined into process S220 of determining the height of the projection screen according to the top facial feature position data and the bottom facial feature position data.

In process S120, the obtained top facial feature position data can refer to the facial feature position data of the distance, position, and height of the user with the face at the top relative to the vehicle-mounted camera device 230 in the collected image. The bottom facial feature position data can refer to the facial feature position data of the distance, position, and height of the user with the face at the bottom relative to the vehicle-mounted camera device 230 in the collected image.

Figure 6B:
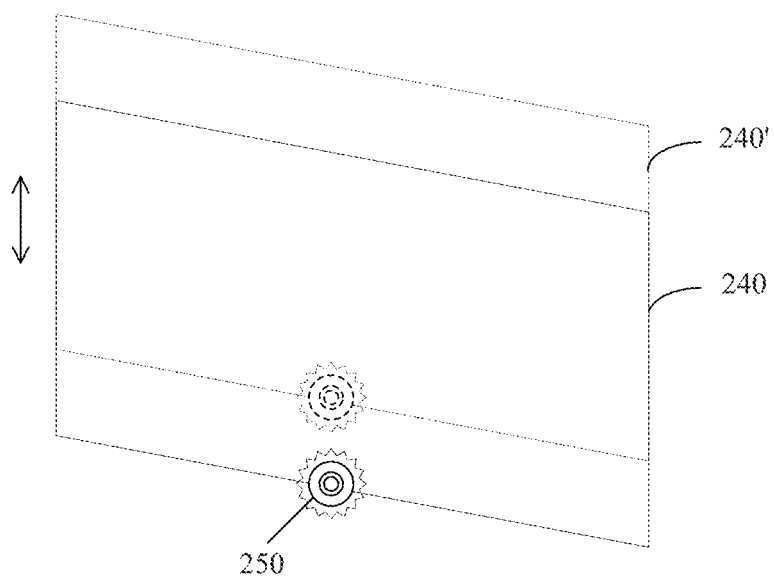
FIG. 6B is a schematic diagram of adjusting a height of a projection screen according to some embodiments of the present disclosure.

An average height of the users relative to the vehicle-mounted camera device 230 can be obtained according to the heights of the users at the top and bottom relative to the camera device 230. The average height can be used as the height parameter of the projection screen 240. As shown in FIG. 6B, the adjustment mechanism 250 can be controlled by the control device 220 to adjust the height parameter to position the projection screen 240 to the projection screen 240'. Thus, the projection screen 240' can be suitable for the users with different heights.

Figure 7A:
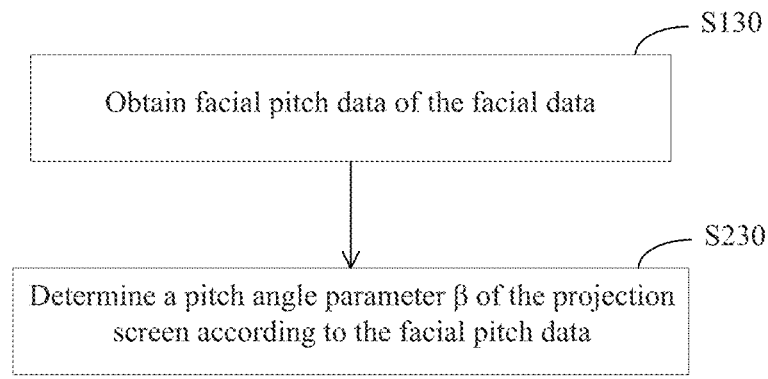
FIG. 7A is a schematic flowchart of determining a pitch parameter of a projection screen according to some embodiments of the present disclosure.

To implement process S200, as shown in FIG. 7A, process S100 is further refined into process S130 of obtaining facial pitch data of the facial data. Subsequently, process S200 is further refined into process S230 of determining a pitch angle parameter β of the projection screen according to the facial pitch data.

Furthermore, with a plurality of users, the facial pitch data can be facial pitch mean value data. The facial pitch mean value can be calculated according to a maximum pitch angular parameter value Pmax and a minimum pitch angular parameter value Pmin of the users collected in process S100. The mean value calculation method can include but is not limited to arithmetic mean calculation and weighted mean calculation.

Figure 7B:
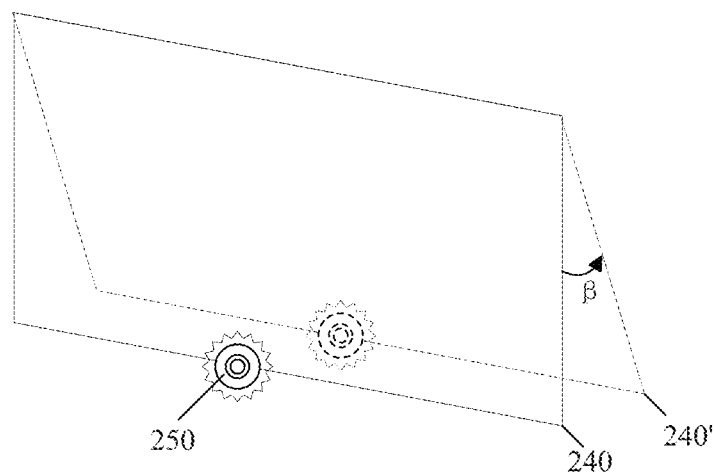
FIG. 7B is a schematic diagram of adjusting a pitch angle of a projection screen from a main view angle according to some embodiments of the present disclosure.

After obtaining the pitch mean value data P of the maximum pitch angle and the minimum pitch angle of the faces of the users on site, the control device 220 can control the adjustment device 25 to rotate and adjust the pitch angle of the projection screen 240 to allow the users to view the screen with a comfortable pitch angle. As shown in FIG. 7B, the angle that the projection screen 240 is rotated to the projection screen 240' from the initial state is the pitch angular parameter β of the projection screen 240.

As shown in FIGS. 5A, 5B, 6A, 6B, 7A, and 7B, after the control device 220 obtains the facial data of the at least one user outside the vehicle, the control device 220 determines the pose parameter of the projection screen 240 according to the obtained user facial data to implement process S200. The pose parameter can refer to the position and orientation of the projection screen 240, including the roll angular parameter, the height parameter, and the pitch angular parameter of the projection screen 230 obtained based on the user facial data.

In step S300, the control device 220 can control the adjustment device 250 connected to the projection screen 240 based on the pose parameter of the projection screen 240. Thus, the projection screen 240 can be adjusted to the suitable position and orientation according to the pose parameter.

In some embodiments of the present disclosure, the adjustment device 250 can include a plurality of sub-adjustment devices arranged on the upper and lower edges of the projection screen. For example, a sub-adjustment mechanism can be arranged at the centers of the upper and lower edges, two sub-adjustment devices can be arranged at the left and right corners of the upper and lower edges, or a sub-adjustment device can be arranged at the centers of the upper edge and two sub-adjustment devices can be arranged at the lower edge. The structure of the adjustment device 250 can include a gear that moves in a predetermined track.

The structure, quantity, and position of the adjustment device 250 can be adjusted according to actual situations and in connection with the vehicle structure and the user viewing requirements, and are not limited to the examples above. The adjustment mechanism arranged at the upper part can be configured to fix the upper part of the projection screen 240, and the adjustment mechanism arranged at the lower part can be configured to fix the lower part of the projection screen 240.

After the projection screen 240 of the vehicle is adjusted to the suitable pose, process S400 can be performed. The control device 220 of the vehicle can control the vehicle-mounted projection device 260 to project the video data of the video and audio data onto the projection screen 230. Meanwhile, process S500 can be performed. The control device 220 can control the vehicle-mounted external speakers 270 to synchronously broadcast the audio data of the video and audio data outside to perform the vehicle-mounted video and audio playback.

In the method of the present disclosure, the position of the projection screen can be adjusted automatically according to the facial data of the user to provide better view angle for the user. The user does not need to adjust the position of the projection screen. Thus, the user experience of the vehicle-mounted video and audio mode is improved.

In some other embodiments of the present disclosure, when the distance between the projection screen 230 of the vehicle prepared for vehicle-mounted video and audio playback and the user is too large, or when the relative angle between the projection screen 230 and the user deviates significantly, the position of the current vehicle may need to be adjusted accordingly. Thus, the distance and the angle of the projection screen 230 relative to the user can be within the range for viewing the vehicle-mounted video and audio. Thus, a better viewing angle can be provided for the user by adjusting the pose of the projection screen.

Figure 8:
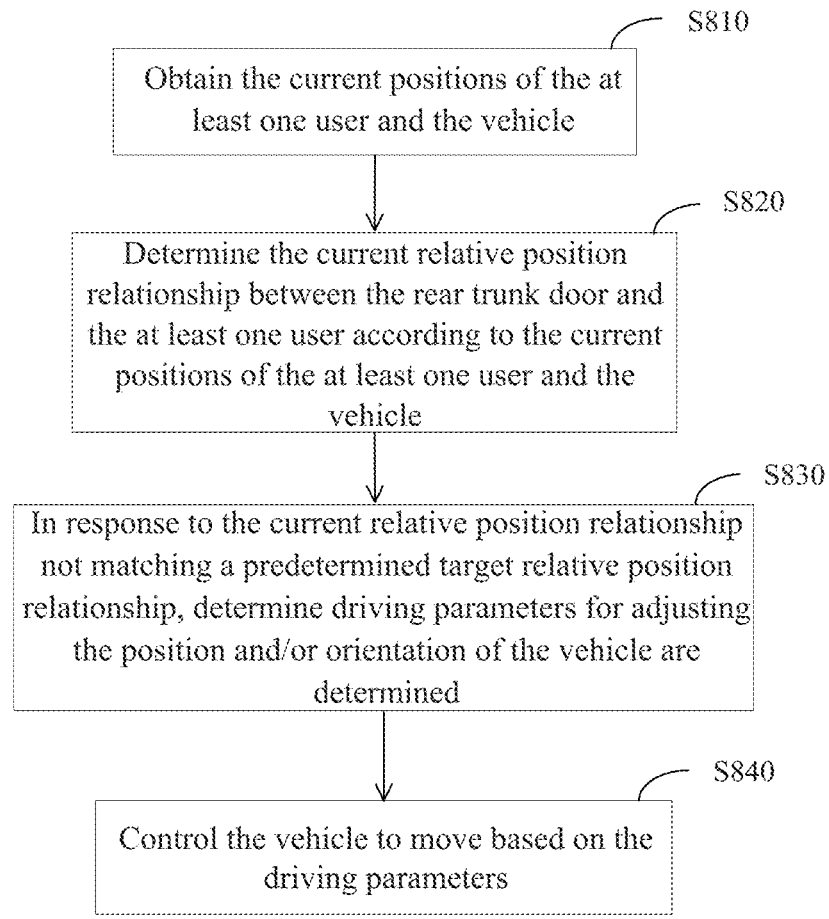
FIG. 8 is a schematic flowchart of adjusting a vehicle position of a control method for playing the video and audio on the vehicle according to some embodiments of the present disclosure.
Figure 9:
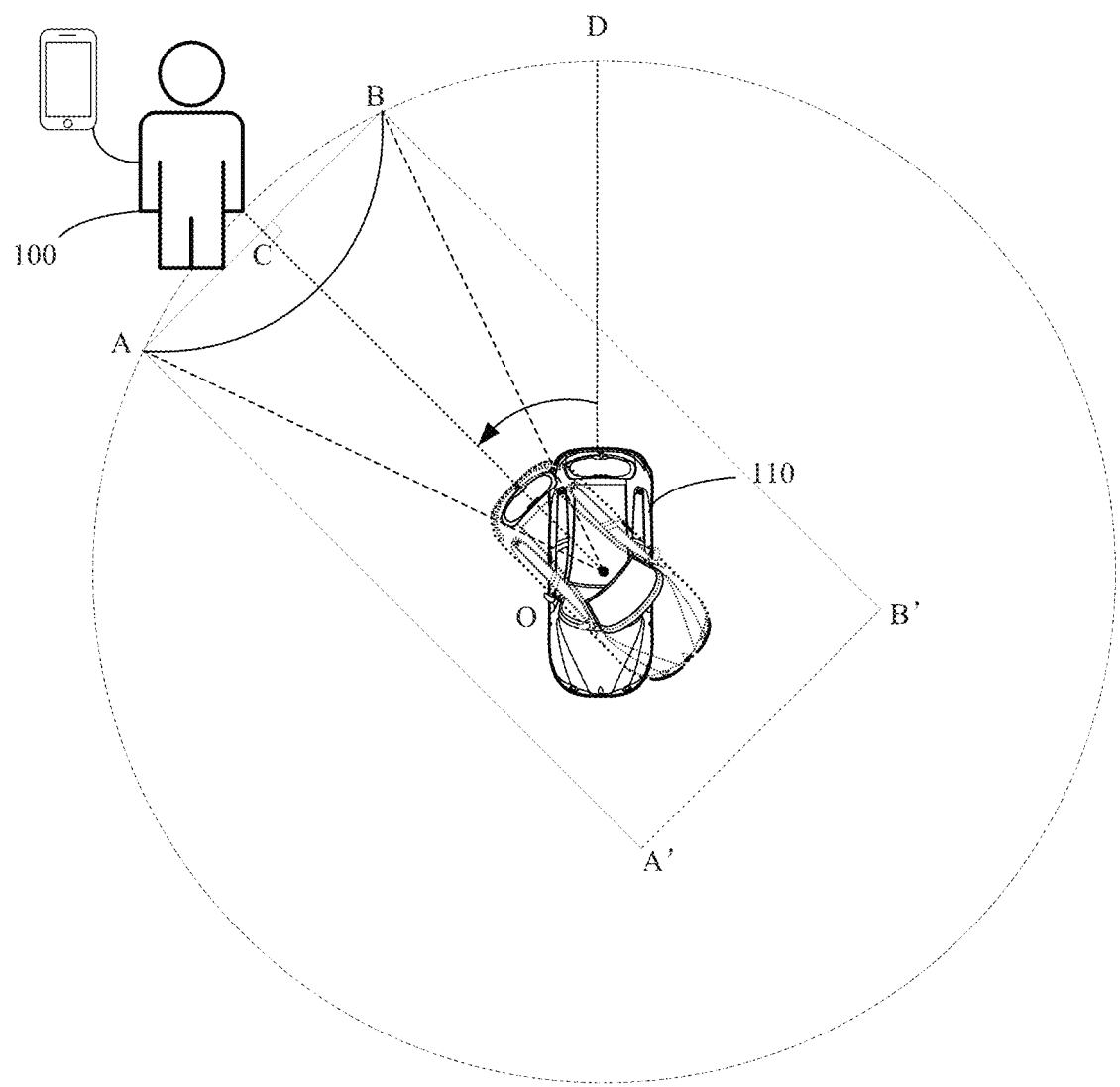
FIG. 9 is a schematic diagram of adjusting a vehicle position of a control method for playing the video and audio on the vehicle according to some embodiments of the present disclosure.

FIG. 8 is a schematic flowchart of adjusting a vehicle position of the control method for vehicle-mounted video and audio playback according to some embodiments of the present disclosure. FIG. 9 is a schematic diagram of adjusting the vehicle position of the control method for vehicle-mounted video and audio playback according to some embodiments of the present disclosure.

In some embodiments, after the vehicle-mounted video and audio mode is activated, whether the vehicle position needs to be adjusted can be determined, especially the position relationship between the rear trunk door of the vehicle and the user. Thus, the position and angle of the rear trunk door of the vehicle can adapt to the viewing angles of the users on site. Thus, in the subsequent processes, the angle of the projection screen can be fine-adjusted according to the facial data of the user to provide a better viewing angle for the user.

As shown in FIG. 8, adjusting the position of the vehicle includes the following processes.

At S810, the current positions of the at least one user and the vehicle are obtained.

At S820, the current relative position relationship between the rear trunk door and the at least one user is determined according to the current positions of the at least one user and the vehicle.

At S830, in response to the current relative position relationship not matching a predetermined target relative position relationship, driving parameters for adjusting the position and/or orientation of the vehicle are determined.

At S840, the vehicle is controlled to move based on the driving parameters.

In process S810, the vehicle and the user can be positioned through vehicle-mounted ultra wide band (UWB) carried by the vehicle and the smart mobile terminal carried by the user to obtain the current position of the at least one user and the vehicle. UWB is a wireless communication technology, in which a narrow pulse of a non-sinusoidal wave in the nanosecond to microsecond range can be used to transmit data. UWB can realize a data transmission rate ranging from hundreds of Mbit/s to several Gbit/s within about 10 meter range. UWB can have strong resistance to interference, high transmission rate, and large system capacity. A UWB system can have very low emission power. Communication equipment can realize communication by using emission power lower than 1 mW. With the low emission power of UWB, the working time of the system power source can be significantly extended.

In some embodiments, as shown in FIG. 9, the vehicle-mounted UWB is located at center point O of the vehicle body. The user 100 carries smart equipment, such as a cellphone, to maintain communication with the vehicle-mounted UWB of the vehicle 110. Thus, the current position information of the vehicle 110 can be obtained, and the current position information of the user 100 can also be obtained.

Furthermore, in process S820, the current relative position relationship between the rear trunk door and the at least one user can be determined according to the current positions of the at least one user and the vehicle. In process S820, after the control device 220 obtains the current position information of the vehicle 110 and the current position information of the user 100, the control device 220 can determine the current relative position relationship between the rear trunk door of the vehicle 110 and the user 100. The relative position relationship can include the relative angle and the relative distance. As shown in FIG. 9, in the initial state, point O represents the center point of the vehicle body. The direction of the connecting line of the center point of the vehicle and the vehicle rear trunk door is the facing direction of the rear trunk door and also the facing direction of the projection screen. As shown in FIG. 9, the rear trunk door of the vehicle 110 faces point D directly above in FIG. 9. The user 100 is on the left side of the rear trunk door of the vehicle 110. The distance between the user 100 and the vehicle 110 is relatively far, and the vehicle 110 has a large relative angle relative to the user. Thus, it is difficult to reach a good effect using the adjustment mechanism 250 to adjust the pose of the projection screen 240. The tail of the vehicle may need to be adjusted to face the user.

In some other embodiments, the vehicle-mounted camera device 230 can be configured to obtain the current positions of the user and the vehicle and the current relative position relationship between the user and the vehicle. The vehicle-mounted camera device 230 can be the camera device arranged at the projection screen. In some other embodiments, the vehicle-mounted camera device 230 can also be a panoramic or wide-angle camera facing toward the tail of the vehicle different from the camera device arranged at the projection screen. Thus, the current position of the vehicle can be characterized based on the vehicle-mounted camera device 230, e.g., the current position of the rear trunk door can be characterized. The current relative position relationship between the user and the rear trunk door of the vehicle can be determined according to the user image obtained by the camera device.

In process S830, in response to the current relative position relationship not matching the predetermined target relative position relationship, the driving parameters for adjusting the position and/or orientation of the vehicle may need to be determined. That is, before performing process S830, whether the current relative position relationship of the vehicle 110 and the user 100 matches the predetermined target relative position relationship may need to be determined first. If the current relative position relationship matches the target relative position relationship, the position of the vehicle may not need to be adjusted. If the current relative position relationship does not match the target relative position relationship, the position of the vehicle may need to be adjusted.

The target relative position relationship can further include a target position relationship and a target relative angle relationship. As shown in FIG. 9, the target position relationship and the target relative angle relationship are explained. The target position relationship relates to the position of the center point of the vehicle body. The target relative angle relationship relates to the direction of the connecting line between the center point of the vehicle body and the rear trunk door, that is the relative angle between the facing direction of the rear trunk door and the facing direction of the user.

As shown in FIG. 9, positioning is performed based on UWB equipment. The user 100 provides own position information through the UWB positioning device of the smart equipment. That is, the user draws an arc from left to right facing forward. End points A and B of the arc represent the area that the user is located. The direction where the arc protrudes represents the facing direction of the user.

Therefore, center point O of the vehicle body may be expected to be within a rectangle AA'B'B with AB as a side. That is, the target position relationship can be the position represented by the rectangle AA'B'B. The length of side AA' of the rectangle AA'B'B can be the predetermined and acceptable maximum distance h (e.g., 10 m) between the vehicle and the user. Meanwhile, the target relative angle relationship can constrain that connecting line OD between the center point O of the vehicle body and the rear trunk door should be within the triangle area formed by center point O of the vehicle body, point A, and point B.

If the center point of the vehicle body is outside the rectangle AA'B'B, on one hand, it can indicate that the vehicle is too far to the left or to the right of the user. Thus, even if line OD representing the facing direction of the rear trunk door is within the area of triangle OAB, the user may still need to turn sideways to face the rear trunk door. On another hand, it indicates that the vehicle is too far away from the user. The user may not see the projection screen clearly, especially for near-sighted users.

If line OD representing the orientation of the rear trunk door is outside the area of triangle OAB, even if center point O of the vehicle body is inside the area of rectangle AA'B'B, the user may still need to turn sideways or change positions to face the rear trunk door. Therefore, the target relative position relationship may need to be considered in two dimensions.

As shown in FIG. 9, center point O of the vehicle body is inside rectangle AA'B'B. However, connecting line OD between center point O of the vehicle body and the rear trunk door is not in the area of triangle OAB, the relative angle between the vehicle 110 and the user does not match the predetermined target relative angle relationship.

If it is determined that the current relative position relationship does not match the predetermined target relative position relationship, the driving parameters for adjusting the position and/or orientation of the vehicle may need to be determined. Although the target relative position relationship is a range when determining the current relative position relationship, since the position of the vehicle needs to be adjusted, the driving parameters may need to be determined with the best target position.

The optimal target position above is related to the middle point of line segment AB. Generally, the arc from A to B determined by the user through the UWB equipment can be drawn with the user as the center point. Thus, as shown in FIG. 9, points A and B are connected, and middle point C of line segment AB is determined. Point C represents the position of the user. A perpendicular line to line segment AB is drawn through point C. Thus, the direction of the perpendicular line can be the facing direction of the user. Therefore, connecting line OD between center point O of the vehicle body and the rear trunk door may need to coincide with the perpendicular line (best orientation and facing direction). After the adjustment, the distance between center point O of the vehicle body and point C may be expected to be the predetermined distance h (best distance).

As shown in FIG. 9, center point O of the vehicle body is on the perpendicular line. If center point O of the vehicle body is already on the perpendicular line, and the distance between O and C is less than or equal to the predetermined distance h, the vehicle does not need to move any more. The vehicle may only need to be rotated. That is, the rotation angle for rotating the vehicle from the direction OD to the direction OC is determined to be the steering angle of the vehicle to determine the driving parameter.

On another hand, if center point O of the vehicle body is not on the perpendicular line, or even if center point O of the vehicle body is on the perpendicular line, but the distance between point O and point C exceeds the predetermined distance h, the vehicle may need to be moved to cause the center point of the vehicle body to move to the best position. Thus, the moving trajectory of the vehicle may need to be determined according to the current position of the center point of the vehicle body and the best position of the center point of the vehicle body to determine the driving parameter.

In some embodiments, obstacle information on the moving trajectory of the vehicle may need to be considered to adjust the moving trajectory of the vehicle to avoid the obstacle.

Then, in process S840, the vehicle can be controlled to move based on driving parameter. When the current relative position relationship between the vehicle 110 and the user 100 does not match the target relative position relationship, based on the rotation angle and/or the moving trajectory of the driving parameter, the vehicle 110 can be adjusted to be within the range of the target relative position relationship with the user 100.

If the driving parameter of adjusting the position and orientation of the vehicle is determined in process S830, process S840 can be divided into two sub-processes, including moving the vehicle to adjust the orientation of the vehicle after determining the rotation angle, and moving the vehicle to adjust the position of the vehicle after determining the moving trajectory, which can be performed in an interchangeable sequence. In some other embodiments, after determining the rotation angle and the moving trajectory, the vehicle can be moved to synchronously adjust the orientation and position of the vehicle to adjust the relative position relationship between the vehicle and the user.

In the above embodiments, the position and orientation of the user can be used as references. The position of the projection screen outside the vehicle can be set by one button, which increases the convenience of adjusting the projection screen for the user. The control method for vehicle-mounted video and audio playback of the present disclosure is described. The control method can include projecting the video and audio for the user outside the vehicle, and automatically adjusting the position of the vehicle-mounted projection screen according to the facial data of the user to adapt to the viewing angle of the user. Thus, the user experience of the vehicle-mounted video and audio mode can be significantly improved.

The present disclosure further provides a control device for vehicle-mounted video and audio playback. The device can include at least one processor and a memory coupled with the at least one processor. The memory can store instructions that, when executed by the at least one processor, cause the control device to perform the control method for vehicle-mounted video and audio playback shown in FIG. 3.

Figure 10:
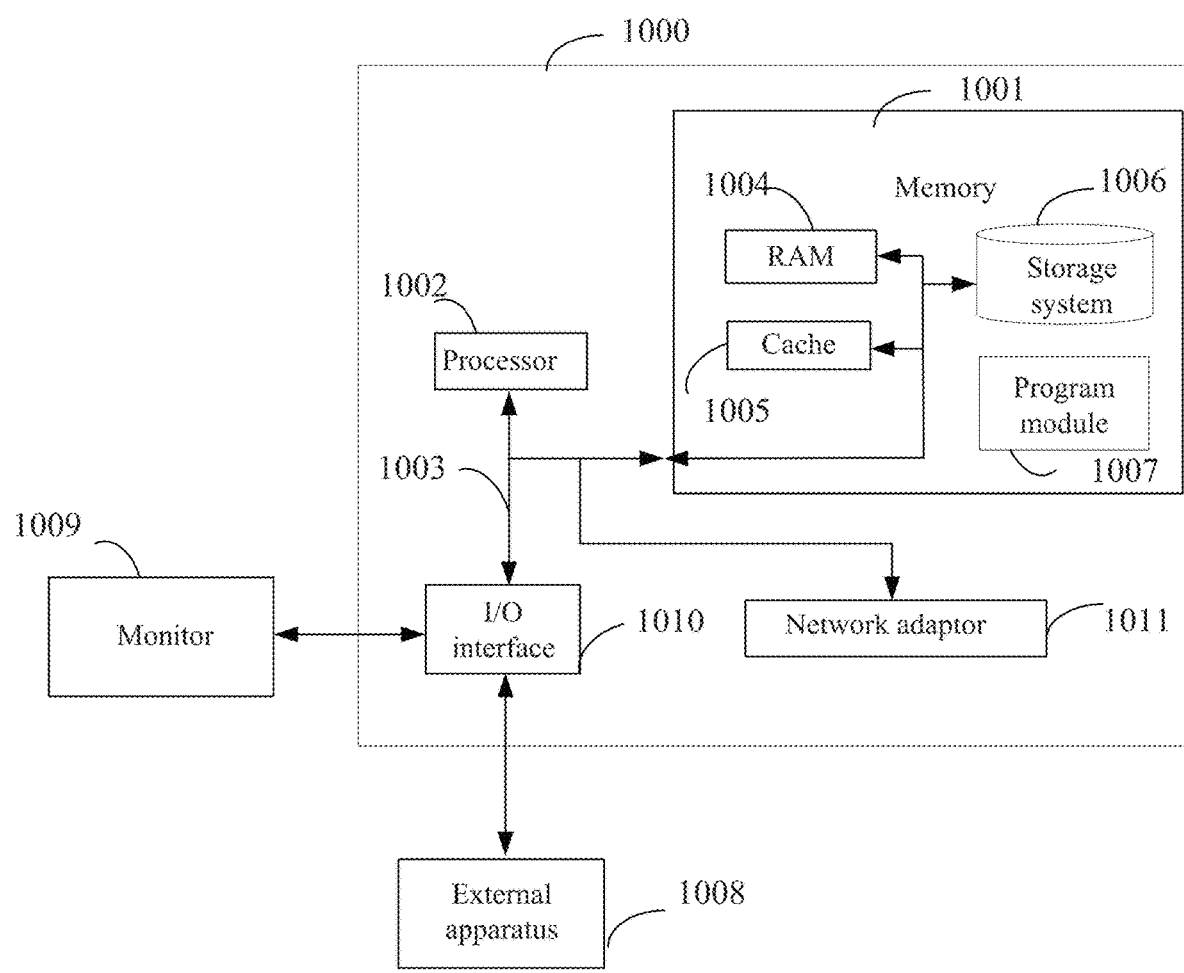
FIG. 10 is a schematic structural diagram of a control device for playing the video and audio on the vehicle according to some embodiments of the present disclosure.

As shown in FIG. 10, the control device 1000 for vehicle-mounted video and audio playback of the present disclosure is explained. As shown in FIG. 10, the control device 1000 is represented by general-purpose computer equipment and is configured to implement the processes of the control method for vehicle-mounted video and audio playback of any embodiment of the present disclosure. For the description of the control method for vehicle-mounted video and audio playback, reference can be made above, which is not repeated here.

The control device 1000 can include one or more memories 1001, one or more processors 1002, and a bus 1003 that connects various system assemblies (including memories 1001 and processors 1002).

The bus 1003 can include a data bus, an address bus, and a control bus. The product of the number of bits in the data bus and the working frequency is proportional to the data transfer rate. The number of bits in the address bus can be used to determine the maximum addressable memory space. The control bus (read/write) can indicate the type of the bus cycle and the time for completing the input/output operation. The processors 1002 are connected to the memories 1001 via the bus 1003 and are configured to implement the control method for vehicle-mounted video and audio playback of any of the above embodiments.

The processors 1002 can be used as the computational and control core of the control device 1000 and are execution units for processing information and running programs. Operations of all software layers in the computer system can be mapped to operations of the processors 1002 through an instruction set. The processors 1002 can be configured to process instructions, perform operations, control time, and process data.

The memories 1001 can include various storage devices that store programs and data in the computer. The memories 1001 can include computer-readable media in the form of volatile storage devices. for example, random access memory (RAM) 1004 and/or high-speed cache 1005.

The RAM 1004 is an internal memory that directly exchanges data with the processors 1002. The RAM 1004 can be read from and written to at any time (except during refresh) and can be very fast. The RAM 1004 can be usually used as a temporary data storage medium for the operating system and other running programs. Once the power is cut off, the data stored can be lost. The high-speed cache 1005 can be a primary memory between the main memory and the processors 1002. The cache 1005 may have a small capacity and a speed much higher than the main memory. The speed of the cache 1005 can be close to the speed of the processors 1002.

The control device 1000 can include a plurality of memories 1001 and a plurality of processors 1002. Both the plurality of memories 1001 and the plurality of processors 1002 can have a distributed structure, for example, including memories and processors located at a local end and located in a cloud end at the back. The control method for vehicle-mounted video and audio playback can be implemented by the local end and the cloud end. Further, in some embodiments of the distributed structure, a specific execution terminal can be adjusted in the processes according to actual situations. A specific solution for implementing the processes at the specific terminal should not limit the scope of the present disclosure.

The control device 1000 can also include other removable/non-removable and volatile/non-volatile computer system storage media. In some embodiments, the storage system 1006 can be configured to read and write non-removable and non-volatile magnetic media.

The memories 1001 can also include at least one set of program modules 1007. The program modules 1007 can be stored in memories 1001. The program modules 1007 can include, but are not limited to, an operating system, one or more applications, other program modules, and program data, where each or a combination of these examples can include the implementation of the network environment. The program modules 1007 can be configured to execute the functions and/or methods of embodiments of the present disclosure.

The control device 1000 can also communicate with one or more external apparatuses 1008. In some embodiments, the external apparatuses 1008 can include an vehicle-mounted camera device, an vehicle-mounted projection device, and an vehicle-mounted external speaker configured to obtain vehicle-mounted data. The external apparatuses 1008 can also include a monitor 1009. When the control method for vehicle-mounted video and audio playback is implemented, the control device 1000 can control the monitor 1009 to display the position relationship between the user and the vehicle.

The control device 1000 can also communicate with one or more apparatuses that enable the user to interact with the control device 1000 and/or with any apparatuses (e.g., network cards, modems, etc.) that allow the control device 100 to communicate with one or more other computation apparatuses. The communication can be performed through an input/output (I/O) interface 1010.

The control device 1000 can also communicate with one or more networks (such as a local area network (LAN), a wide area network (WAN), and/or a public network, e.g., the Internet) through a network adapter 1011. As shown in FIG. 10, the network adapter 1011 communicates with other modules of the control device 1000 through the bus 1003. Although not shown in the figure, other hardware and/or software modules can be used in connection with the control device 1000. The other hardware and/or software modules can include but are not limited to microcode, apparatus drivers, redundant processing units, external disk drive arrays, RAID systems, tape drives, data backup storage systems, etc.

Another aspect of the present disclosure also provides a computer-readable storage medium storing computer programs that, when executed by a processor, cause the processor to perform the processes of the control method for vehicle-mounted video and audio playback of any one of embodiments of the present disclosure. For the description of the processes of the control method, reference can be made to above, which are not repeated here. In addition, the computer-readable storage medium can be in a system format, which includes a plurality of computer-readable storage sub-media. Thus, the processes of the control method for vehicle-mounted video and audio playback can be implemented through the plurality of computer-readable storage media.

The control method, the control system, and the control device for vehicle-mounted video and audio playback of the present disclosure are described. In the present disclosure, the position of the vehicle-mounted projection screen can be automatically adjusted according to the facial data of the user to cause the projection screen to be in the best viewing angle suitable for all users. Thus, the user experience for the vehicle-mounted outside broadcasting video and audio mode can be significantly improved.

Various explanatory logic modules and circuits of embodiments of the present disclosure can be implemented or executed directly by a processor, a digital signal processor (DSP), an application-specific integrated circuit (ASIC), a field programmable gate array (FPGA) or other programmable logic device, discrete gate or transistor logic, a discrete hardware assembly, or any combination for performing the functions of the present disclosure. The processor can be a microprocessor. In some other embodiments, the processor can be any processor, controller, microprocessor, or state machine. The processor can also be implemented as a combination of computer apparatuses, e.g., a combination of the DSP and the microprocessor, a plurality of microprocessors, one or more microprocessors cooperating with the DSP core, or any other such device.

The method or processes of the algorithm of embodiments of the present disclosure can be directly embodied in the hardware, the software module executed by the processor, or a combination thereof. The software modules can be stored in RAM storage, flash memory, ROM storage, EPROM storage, EEPROM storage, registers, hard drives, removable disks, CD-ROMs, or any other form of storage medium known in the art. Exemplary storage media are coupled to processors to enable the processors to read and write information from/to the storage medium. In some other embodiments, the storage medium can be integrated into the processor. The processor and the storage medium can be included in the ASIC. The ASIC can be arranged in the user terminal. In some other embodiments, the processor and the storage medium can be arranged in the user terminal as discrete assemblies.

In some embodiments, the functions described may be implemented in hardware, software, firmware, or any combination thereof. If the functions are implemented as a computer program product in software, the functions can be used as one or more pieces of program instructions or codes stored in the computer-readable medium or transmitted via such a medium. The computer-readable medium can include both a computer storage medium and a communication medium, for example, any medium for transferring the computer program from a place to another place. The storage medium can be any available medium that can be accessed by the computer. For example, the computer-readable medium can include RAM, ROM, EEPROM, CD-ROM, or other optical disk storage, magnetic disk storage, or other magnetic storage devices, or any other medium that can be used to carry or store program codes in the form of instructions or data structures. Any connection can be referred to as a computer-readable medium. For example, if the software is transferred via a coaxial cable, a fiber optic cable, a twisted pair cable, a digital subscriber line (DSL), or a wireless technology such as infrared, wireless, and microwave from a website, a server, or other remote sources, the coaxial cable, the fiber optic cable, the twisted pair cable, the DSL, or the wireless technology such as infrared, wireless, and microwave can be included in the definition of the medium. Disk and disc can include compact discs (CD), laser discs, optical discs, digital versatile discs (DVD), floppy disks, and Blu-ray discs are used in the present disclosure. Disk can be often used to reproduce data in a magnetic manner, and disc can be used to reproduce data in an optical manner. A combination thereof can also be included in the scope of the computer-readable medium.

The above description is provided to enable any those skilled in the art to practice the various aspects described here. The scope of the present disclosure is subject to the appended claims and is not limited to the specific structure and assembly of embodiments of the present disclosure. Those skilled in the art can make various modifications and changes to embodiments of the present disclosure. These modifications and changes are within the scope of the present disclosure.

What is claimed is:

1. A control method for vehicle-mounted video and audio playback comprising:
   in response to activation of an vehicle-mounted video and audio mode, obtaining facial data of at least one user outside a vehicle;
   determining a pose parameter of a projection screen according to the facial data of the at least one user, the projection screen being integrated into a rear trunk door of the vehicle, and the rear trunk door being open, and the projection screen is in an expanded state in the vehicle-mounted video and audio mode;
   adjusting a pose of the projection screen based on the pose parameter;
   controlling an vehicle-mounted projection device to project video data of video and audio data onto the projection screen; and
   controlling an vehicle-mounted external speaker to synchronously broadcast audio data of the video and audio data.

2. The control method according to claim 1, wherein:
   the facial data includes leftmost facial feature position data and rightmost facial feature position data; and
   determining the pose parameter of the projection screen according to the facial data of the at least one user further includes:
      determining a roll angle parameter of the projection screen according to the leftmost facial feature position data and the rightmost facial feature position data.

3. The control method according to claim 1, wherein:
   the facial data includes topmost facial feature position data and bottommost facial feature position data; and
   determining the pose parameter of the projection screen according to the facial data of the at least one user further includes:
      determining a height parameter of the projection screen according to the topmost facial feature position data and the bottommost facial feature position data.

4. The control method according to claim 1, wherein:
   the facial data includes facial pitch data; and
   determining the pose parameter of the projection screen according to the facial data of the at least one user further includes:
      determining a pitch angle parameter of the projection screen according to the facial pitch data.

5. The control method according to claim 4, wherein the facial pitch data is a mean pitch value data of the at least one user.

6. The control method according to claim 1, further comprising, before obtaining the facial data of the at least one user outside the vehicle:
   obtaining a current position of the at least one user and a current position of the vehicle;
   determining current relative position relationship between a rear trunk door and the at least one user according to the current position of the at least one user and the current position of the vehicle;
   in response to the current relative position relationship not matching a predetermined target relative position relationship, determining a driving parameter for adjusting a position and/or an orientation of the vehicle; and
   controlling the vehicle to move based on the driving parameter.

7. The control method according to claim 6, wherein:
   the current relative position relationship includes a current relative angle between the rear trunk door and the at least one user, and the target relative position relationship includes a target relative angle between the rear trunk door and the at least one user; and
   determining the driving parameter for adjusting the position and/or the orientation of the vehicle further includes:
      determining a steering angle for rotating the vehicle from the current relative angle to the target relative angle as the driving parameter based on the current relative angle and the target relative angle.

8. The control method according to claim 6, wherein:
   the target relative position relationship includes a target position of the rear trunk door relative to the at least one user; and
   determining the driving parameter for adjusting the position and/or the orientation of the vehicle further includes:
      determining a moving trajectory of the vehicle from the current position to the target position as the driving parameter based on the current position and the target position of the vehicle.

9. A control system for vehicle-mounted video and audio playback comprising:
   a control device;
   an adjustment mechanism;
   a projection screen connected to a rear trunk door of a vehicle via the adjustment mechanism to expand the projection screen when the rear trunk door is opened;
   an vehicle-mounted projection device arranged in an inner space enclosed by panels of a vehicle body of the vehicle and configured to project video data of video and audio data onto the projection screen when the vehicle-mounted projection device is activated;
   an vehicle-mounted external speaker arranged on an inner side of the panels of the vehicle body of the vehicle and configured to synchronously broadcast audio data of the video and audio data after the vehicle-mounted external speaker is activated;
a wakeup subsystem configured to wake up a control device based on a predetermined instruction to open the rear trunk door of a vehicle, the vehicle-mounted projection device, and the vehicle-mounted external speaker; and
an vehicle-mounted camera device configured to obtain facial data of at least one user outside the vehicle;
wherein:
the control device is communicatively connected to the vehicle-mounted camera device, the adjustment mechanism, the vehicle-mounted projection device and the vehicle-mounted external speaker;
the control device is configured to:
receive the facial data of the at least one user outside the vehicle obtained by the vehicle-mounted camera device after being woken up by the wake-up sub-system to open the rear trunk door of the vehicle, the vehicle-mounted projection device, and the vehicle-mounted external speaker;
determine a pose parameter of the projection screen according to the facial data of the at least one user; and
output the pose parameter to the adjustment mechanism; and
the adjustment mechanism is configured to adjust a pose of the projection screen based on the pose parameter.

10. The control system according to claim 9, further comprising:
a positioning device and a power system communicatively connected to the control device;
wherein:
the control device is further configured to, before the facial data of the at least one user outside the vehicle is obtained:
obtain a current position of the at least one user and a current position of the vehicle based on the positioning device;
determine a current relative position relationship between the rear trunk door and the at least one user according to the current position of the at least one user and the current position of the vehicle;
in response to the current relative position relationship not matching the predetermined target relative position relationship, determining a driving parameter for adjusting a position and/or an orientation of the vehicle; and
controlling the power system to move the vehicle based on the driving parameter.

11. The control method according to claim 9, wherein:
the facial data includes leftmost facial feature position data and rightmost facial feature position data; and
the control device is further configured to:
determine a roll angle parameter of the projection screen according to the leftmost facial feature position data and the rightmost facial feature position data.

12. The control system according to claim 9, wherein:
the facial data includes topmost facial feature position data and bottommost facial feature position data; and
the control device is further configured to:
determine a height parameter of the projection screen according to the topmost facial feature position data and the bottommost facial feature position data.

13. A control device for vehicle-mounted video and audio playback comprising:
one or more processors; and
one or more memories coupled to the one or more processors and storing instructions that, when executed by the one or more processors, cause the one or more processors to:
in response to activation of an vehicle-mounted video and audio mode, obtain facial data of at least one user outside a vehicle;
determine a pose parameter of a projection screen according to the facial data of the at least one user, the projection screen being integrated into a rear trunk door of the vehicle, and the rear trunk door being open, and the projection screen is in an expanded state in the vehicle-mounted video and audio mode;
adjust a pose of the projection screen based on the pose parameter;
control an vehicle-mounted projection device to project video data of video and audio data onto the projection screen; and
control an vehicle-mounted external speaker to synchronously broadcast audio data of the video and audio data.

14. The control device according to claim 13, wherein:
the facial data includes leftmost facial feature position data and rightmost facial feature position data; and
the one or more processors are further configured to:
determine a roll angle parameter of the projection screen according to the leftmost facial feature position data and the rightmost facial feature position data.

15. The control device according to claim 13, wherein:
the facial data includes topmost facial feature position data and bottommost facial feature position data; and
the one or more processors are further configured to:
determine a height parameter of the projection screen according to the topmost facial feature position data and the bottommost facial feature position data.

16. The control device according to claim 13, wherein:
the facial data includes facial pitch data; and
the one or more processors are further configured to:
determine a pitch angle parameter of the projection screen according to the facial pitch data.

17. The control device according to claim 16, wherein the facial pitch data is a mean pitch value data of the at least one user.

18. The control device according to claim 13, wherein the or more processors are further configured to, before obtaining the facial data of the at least one user outside the vehicle:
obtain a current position of the at least one user and a current position of the vehicle;
determine current relative position relationship between a rear trunk door and the at least one user according to the current position of the at least one user and the current position of the vehicle;
in response to the current relative position relationship not matching a predetermined target relative position relationship, determine a driving parameter for adjusting a position and/or an orientation of the vehicle; and
control the vehicle to move based on the driving parameter.

19. The control device according to claim 18, wherein:
the current relative position relationship includes a current relative angle between the rear trunk door and the at least one user, and the target relative position relationship includes a target relative angle between the rear trunk door and the at least one user; and the or more processors are further configured to:
  determine a steering angle for rotating the vehicle from the current relative angle to the target relative angle as the driving parameter based on the current relative angle and the target relative angle.

20. The control device according to claim 18, wherein:
the target relative position relationship includes a target position of the rear trunk door relative to the at least one user; and the or more processors are further configured to:
  determine a moving trajectory of the vehicle from the current position to the target position as the driving parameter based on the current position and the target position of the vehicle.

\* \* \* \* \*